United States Patent [19]
Gayfer et al.

[11] Patent Number: 5,211,450
[45] Date of Patent: May 18, 1993

[54] EMPTY/LOAD VALVE

[75] Inventors: Robert Gayfer, Ganonoque, Canada; Walter E. Rojecki, Watertown, N.Y.

[73] Assignee: Knorr Brake Holding Corporation, Westminster, Md.

[21] Appl. No.: 758,558

[22] Filed: Sep. 12, 1991

[51] Int. Cl.$^5$ .................... B60T 8/30; B60T 8/22
[52] U.S. Cl. .................... 303/22.2; 303/9.69; 303/22.8
[58] Field of Search .................... 303/22.1-22.8, 303/9.69

[56] References Cited

U.S. PATENT DOCUMENTS

| | | | |
|---|---|---|---|
| 3,285,674 | 11/1966 | Eaton | 303/22.8 X |
| 3,606,485 | 9/1971 | Scott | 303/22.2 |
| 3,671,086 | 6/1972 | Scott | 303/22.2 |
| 3,927,916 | 12/1975 | Masuda | 303/22.8 |
| 3,929,384 | 12/1975 | Larsen | 303/22.7 |
| 3,936,097 | 2/1976 | Yanagawa et al. | 303/22.8 |
| 4,045,094 | 8/1977 | Yanagawa et al. | 303/22.7 |
| 4,444,439 | 4/1984 | Fauck et al. | 303/22.7 |
| 4,453,779 | 1/1984 | Bridigum | 303/22.5 |
| 4,597,610 | 7/1986 | Stumpe | 303/22.8 |
| 4,653,812 | 3/1987 | Engle | 303/33 |
| 4,844,554 | 7/1989 | Rojecki | 303/22.7 |
| 5,005,915 | 4/1991 | Hart et al. | 303/22.2 |
| 5,106,168 | 4/1992 | McKay | 303/22.7 X |

FOREIGN PATENT DOCUMENTS

| | | | |
|---|---|---|---|
| 2640993 | 3/1978 | Fed. Rep. of Germany | 303/22.7 |
| 3216407 | 9/1983 | Fed. Rep. of Germany | 303/22.7 |
| 3922892 | 1/1991 | Fed. Rep. of Germany | 303/22.8 |

Primary Examiner—Robert J. Oberleitner
Assistant Examiner—Alfred Muratori
Attorney, Agent, or Firm—Barnes & Thornburg

[57] ABSTRACT

An empty-load device, having in a single housing, a sensing piston and a ratio piston interconnected by a push rod, which senses load. A ratio valve, including a valving element and valve seat, is mounted on and travels with the ratio piston and is opened by the push rod. The ratio valve is connected to the ratio piston by a spring such that the push rod engages the ratio valve to open the ratio valve and position the ratio piston via the spring.

19 Claims, 2 Drawing Sheets

EMPTY/LOAD VALVE

BACKGROUND AND SUMMARY OF THE INVENTION

The present invention relates to empty-load changeover apparatus and more specifically, to a combined empty-load changeover and load-sensing and proportioning device.

An empty-load changeover apparatus currently in use as a changeover device mounted to pipe bracket and a separate load-sensing mechanism is shown in U.S. Pat. No. 3,671,086 to Scott and generally known as an SC-1 valve. This apparatus is much too large and heavy to be mounted on a railroad truck. U.S. Pat. No. 4,653,812 to Engle discloses a combined empty-load changeover and load-sensing device capable of being mounted to a railroad truck, but is also much too large and heavy. A much lighter and more compact empty-load valve device is shown in U.S. Pat. No. 4,844,554 to Rojecki. Although Rojecki was an improvement over the prior art, it was a specialty valve.

Thus, it is an object of the present invention to provide an empty-load device which has a minimum piping requirement and uses more standard parts.

Another object of the present invention is to provide an empty-load device which protects against erroneous and false indication of car loading by movement of the load-sensing arm caused by rock and roll of the car.

These other objects are achieved by an empty-load device having a single housing, which includes a brake cylinder, control valve, and equalizing valve ports. A sensing piston and ratio piston are interconnected by a push rod which selectively controls the fluid pressure at the brake cylinder port in accordance with sense load force. A ratio valve bypasses the ratio piston and in combination limits the fluid pressure at the brake cylinder port. The improvement of the structure includes the ratio valve being mounted on and travelling with the ratio piston. The push rod engages and maintains the ratio valve open except for empty sensed load force. The ratio valve is a check valve including a valve seat in the ratio piston, a valving element, a spring cage, and a valve spring in the ratio piston. The ratio piston and the sensing piston face each other, and the brake cylinder port lies therebetween. The ratio valve is on the opposite and smaller surface of the ratio piston.

The push rod, which engages the ratio valve, in combination with the valve spring and spring cage maintains the ratio piston against a first stop in the housing for brake release and for a loaded sensed load force. The ratio piston disengages the first stop for an empty sensed load force and the push rod engages the valving element and positions the ratio piston for variations of the empty sensed load force. The ratio piston is also repositioned by differential pressure across the ratio valve for an empty sense load force.

The equalization port is disconnected from the control valve port and connected to an exhaust port when the ratio piston engage the first stop and is connected to the control valve port and disconnected from the exhaust port when the ratio piston disengages from the first stop.

The unique relationship of the push rod with the spring loaded ratio valve mounted in the ratio piston provides protection from the false indication of ca loading by variations from the normal loaded and empty load positions of the sensing arm caused by rock and roll.

Other objects, advantages and novel features of the present invention will become apparent from the following detailed description of the invention when considered in conjunction with the accompanying drawings.

DESCRIPTION OF THE EMBODIMENT

In a rail brake system, emergency and auxiliary reservoirs are charged from a brake pipe through a control valve. In a charged system, no fluid pressure is present in a brake cylinder. The control valve monitors the brake pipe and supplies pressure from the reservoir to or removes pressure from the brake cylinder in response to change of pressure in the brake pipe. Brake pipe systems are well known as described in the patents discussed above.

Figure 1:
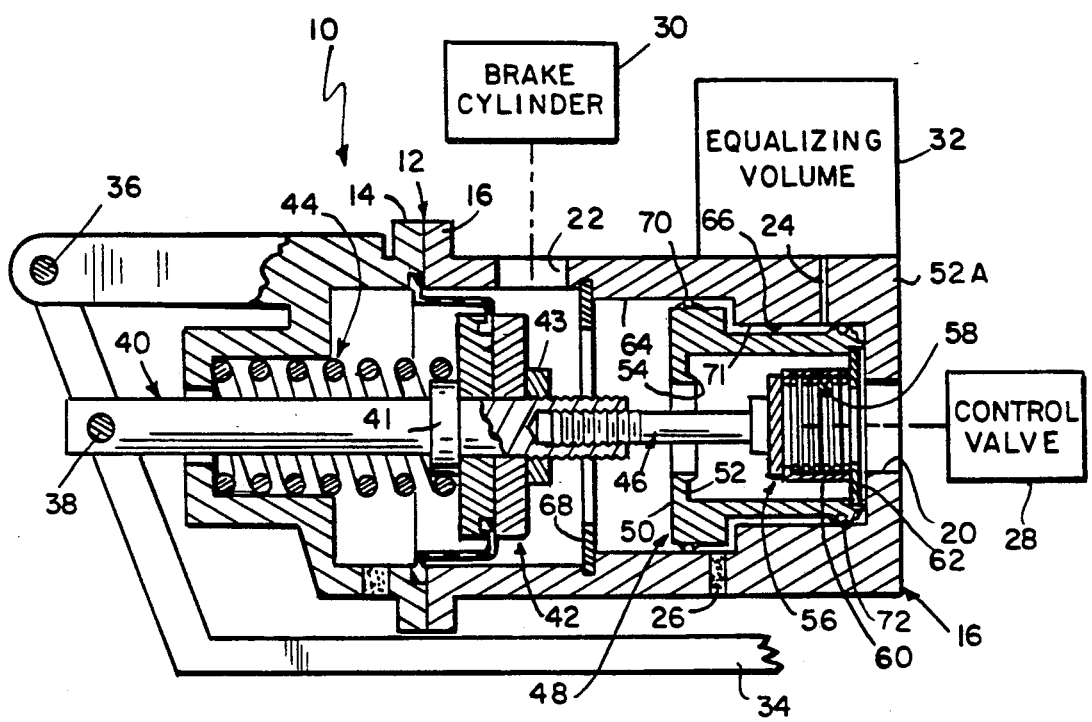
FIG. 1 is a cross-sectional view of an empty-load device incorporating the principles of the present invention in the release position.
Figure 2:
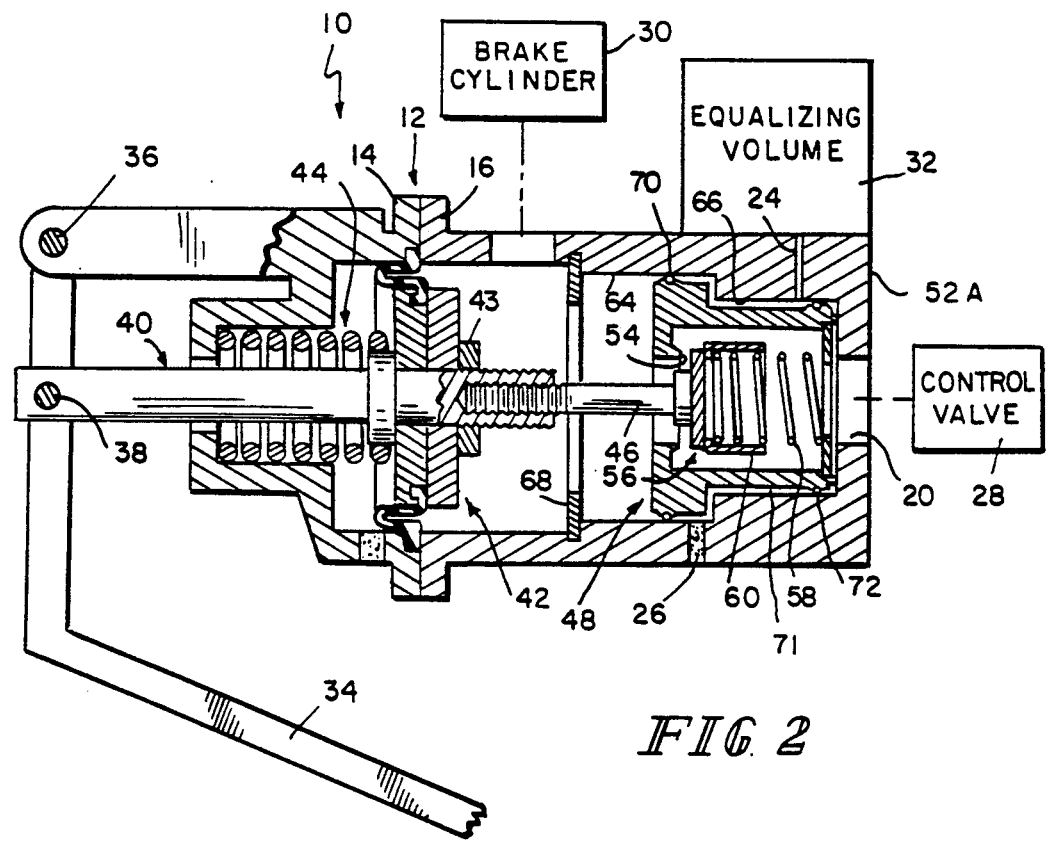
FIG. 2 is a cross-sectional view of the valve of FIG. 1 in the loaded-load position.
Figure 3:
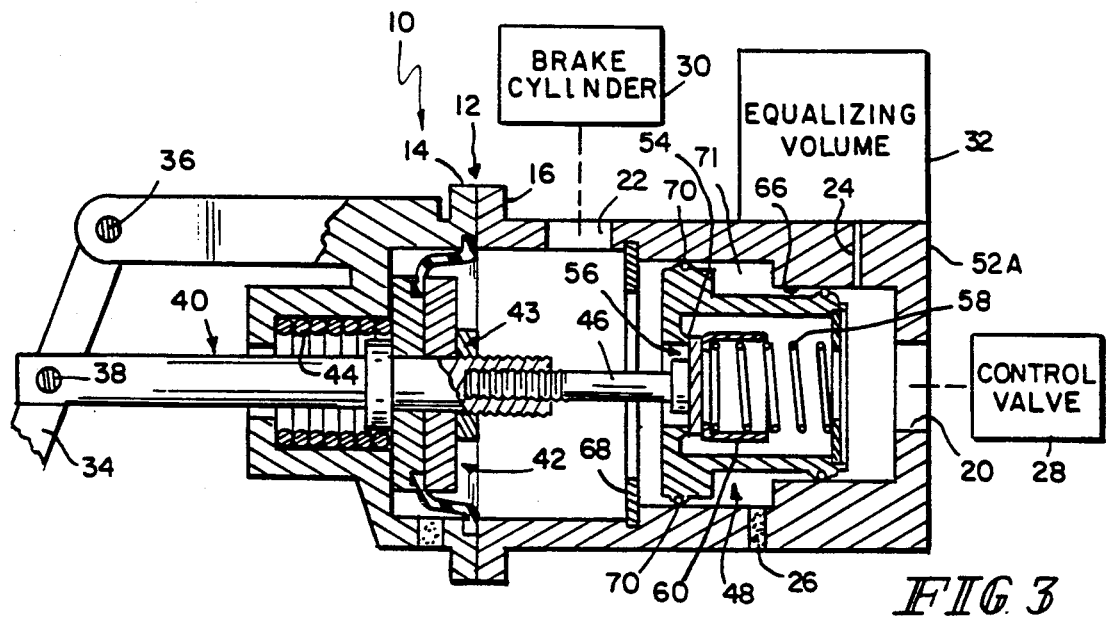
FIG. 3 is a cross-sectional view of the valve of FIG. 1 in the empty-load position.

An empty-load device 10 shown in FIGS. 1-3 includes a housing 12 having first housing portion 14 joined to a second housing portion 16. The housing 12 includes a control valve port 20, a brake cylinder port 22, an equalizing volume port 24, and exhaust port 26. A control valve 28 is connected to control valve port 20; brake cylinder 30 is connected to brake cylinder port 22; and an equalizing volume 32 is mounted to the housing portion 16 and connected to equalizing volume port 24. A load-sensing lever 34 is pivotally connected at 36 to the housing portion 14 and is also pivotally connected at 38 to a push rod 40 extending from the housing portion 14. The sensing lever 34 contacts a portion of an unloaded structure of a railroad car track to sense the load force of the car.

A sensing piston 42 includes a pair of members which are connected to the body 12 by a diaphragm. The sensing piston 42 is secured to the push rod 40 between a shoulder 41 on the push rod and a threaded fastener 43. A spring 44 extends between the housing portion 14 and a face of the sensing piston 42 and biases the sensing piston 42 to the right in the figures. It should be noted that the housing portion 14, the sensing lever 34, the push rod 40, the spring 44, and a sensing piston 42 is substantially as that shown in the Scott U.S. Pat. No. 3,671,086 and is the valve known as SC-1. This reduces the number of special parts.

The push rod 40 includes an actuator 46 threadably received therein and extending through a ratio piston 48. The ratio piston 48 includes a first surface 50 facing a surface of the sensing piston 42 with the brake cylinder port 22 therebetween. A second surface 52 of the ratio portion 40 is smaller than the first surface 50. The second surface 52 also includes the end of the ratio piston 52A. A ratio valve, which bypasses the ratio piston when open, is mounted on and travels with the ratio piston 48. The ratio valve includes a valve seat 54 in the smaller surface 52 of the ratio valve seat 48, a valving member 56, a biasing spring 58, a spring cage 60, and retainer 62. The ratio valve as illustrated is a check valve which is responsive to the position of the actuator portion 46 of the push rod 40 as well as the differential pressure thereacross.

The housing portion 16 includes a first bore 64 and a second smaller bore 66 to receive the ratio piston 48. The end wall of bore 66 acts as a stop for the ratio pistons 48 in its release or loaded position as illustrated in FIGS. 1 and 2. A stop ring 68 is provided in the larger bore 64 as a stop adjacent to the empty load position illustrated in FIG. 3. The exterior surface of the ratio piston 48 is separated from the internal bores 64 and 66 to create a vent space 71 therebetween which is sealed by seals 70 and 72. With the ratio piston 48 in the release or the loaded load position of FIGS. 1 and 2, the internal space 71 connects the equalizing volume port 24 with the exhaust port 26 and disconnects the equalizing port 24 from the control valve port 20. When the ratio piston 48 is moved to its empty load position as illustrated in FIG. 3, the internal space 71 is connected only to the exhaust port 26 and the equalization volume port 24 is disconnected from the exhaust port 26 and is connected to the control valve port 20.

It should be noted that the sensing piston 42, the ratio piston 48, the ratio valve and the push rod 40 are all coaxial. The ratio of travel of the sensing lever 34 to the sensing piston 42 is 5:1. Sensing piston 42 travels, for example 1 inch between the release position of FIG. 1 to the empty position of FIG. 3. The tip of the sensing lever 34 is adjusted for its nominal loaded and unloaded position with respect to the rail car truck and the actuator 46 is adjusted relative to push rod 40 for the nominally defined loaded valve position. The ratio valve spring 58 maintains the valving element 56 in contact with the actuator portion 46 of the push rod 40 and also acts by itself as well as in combination with the cage 60 to position the ratio piston 48 in response to the positioning of the push rod 40.

RELEASE OR CHARGING POSITION

The release or charging position of the empty-load device is illustrated in FIG. 1. With no pressure on the control valve port 20, spring 44 moves the sensing piston 42 to the right forcing the valving element 56 and the cage 60 into contact with retainer 62 forcing the ratio piston 48 into abutment with the interior end face of bore 66. Valving element 56 is displaced from the seat 54, and therefore the brake cylinder port 22 is connected with the control valve port 20 through the ratio piston 48. Thus, the ratio valve bypasses the ratio piston. The sensing lever 34 is against the body 12 as a result of the pressure of spring 44.

LOAD CAR BRAKING

During braking of a loaded car, pressure from the control valve port 20 passes through the valve seat 54 of the ratio piston 48 to the brake cylinder port 22 and into brake cylinder 30. When the fluid pressure on the face of sensing piston 42 matches the equivalent pressure applied by spring 44, the sensing piston 42 will move to the left against the resistance of spring 44. This lowers the sensing lever 34 into contact with the rail car truck. For example, the spring 44 may be rated for 15 psi of pressure on the sensing piston 42. The ratio valve spring 58 causes the ratio valving element 56 to maintain contact with the actuator 46 of the push rod 40 during its travel to the left. Since the car is loaded, the sensing piston 42, push rod 40 and valving element 56 reach the positions illustrated in FIG. 2. Valving element 56 is still displaced from the valve seat 54 and the control valve pressure at port 20 is transmitted unproportioned or unratioed to the brake cylinder port 22.

During the operation of the train, the sensing lever 34 may move above or below the nominal loaded car position due to the rock and roll of the rail car. If the rocking and rolling produces a shortening or raising in the figures of the sensing lever 34, the push rod 40 and actuator 46 will move to the right further opening the ratio check valve. Since the ratio piston 48 is still against the end wall of bore 66 and maintained there by the valve spring 58, movement of the push rod 40 does not affect the connection of the equalizing port 24 with respect to the control valve port 20 and the exhaust port 26. Thus a shortening of the sensing lever 34 does not affect the brake cylinder pressure.

If the rock and roll causes the sensing lever 34 to lengthen the travel or extend down in the figures, this will move the push rod 40 and the valve actuator 46 to the left. This erroneous travel would have no affect on the open connection between the control valve port 20 and the brake cylinder port 22 unless the valving element 56 comes into contact with the valve seat 54. This would represent, for example, 80 percent of the arm travel or 3½ inches of travel of the push rod 40 and a 20 percent load. If the erroneous indication, by a lengthening of the push rod to indicate almost empty load allows the valving element 56 to close on seat 54, the fluid pressure at the control port 20 must exceed the pressure in brake cylinder port 22 by the reciprocal of the ratio piston ratio. Using a typical example of a 60 percent portioning or ratio between faces 50 and 52 of the ratio piston 48 and a 15 psi spring 44, pressure on face 52 would have to exceed 25 psi before the ratio piston 48 would move off the stop from the positions shown in FIGS. 1 and 2. Recognizing that rock and roll motion are equal and opposite and occur in alternating sequence, the erroneous lengthening must occur for a sufficient amount of time to allow the brake pressure at control port 20 to rise to 25 psi before it occupies its opposite rock or roll position. Thus the erroneous signal must be maintained, for example at least 1 to 3 seconds. This is highly unlikely in the real world.

LOADED LOAD BRAKE RELEASE

With the loaded load position of FIG. 2, when the brakes are released, the fluid pressure at the brake cylinder will flow from brake cylinder port 22 through the open ratio valve in the ratio piston 48 to the control valve port 20 where it is exhausted at the control valve 28. When the pressure on sensing piston 42 from the brake cylinder port 22 diminishes below 15 psi, the spring 44 moves the push rod 40, actuator portion 46, valving element 56, valve spring 58 and cage 60 to the right to come to rest in its final position as illustrated in FIG. 1.

EMPTY LOAD CONDITION

For a brake application of an empty loaded car, the fluid pressure at the control valve port flows through the open ratio valve to the brake cylinder 30. After the 15 psi fluid pressure builds up at the brake cylinder port 22, spring 44 is compressed and push rod 40 moves to the left extending sensing lever 34 down. If the rail car is unloaded or empty, the sensing lever 34 would continue downward. Once the push rod 40 reaches approximately less than 20 percent left of its travel which represents a 20 percent loaded car, the valving element 56 will engage the valve seat 54. This cuts off the flow from the control valve port 20 to the brake cylinder port 22. As the sensing lever 34 continues further downward and the push rod 40 continues to the left, the actuator 46 disengages from the closed valving element 56.

As described above, when the fluid pressure at the port 20 reaches a reciprocal of the ratio of the ratio piston or for example 25 psi, the ratio piston 48 will move to the left due to the differential pressure.

As the ratio piston 48 moves to the left, seal 72 passes to the left of the equalizing volume port 24 disconnecting it from the exhaust port 26 and connecting it to the control valve port 20. Fluid pressure at the control valve port 20 will then charge or fill the equalizing volume 32 causing a momentary stall in the movement of the ratio piston 48 while the equalizing volume is charging. Depending upon the value of the pressure at the control valve port 20, the ratio piston 48 will stop when the differential pressure thereacross its reciprocal of the 60 percent ratio.

If the pressure at the control valve port 20 is sufficiently high, the ratio piston 48 and the closed ratio valve will continue moving to the left until the ratio valving element 56 comes into contact with the actuator 46 of the push rod 40. Since the ratio of the ratio piston 48 is the same whether the ratio valve is open or closed, the ratio piston will continue moving unseating the check valve by contact with the actuator 46. Fluid pressure will then flow through the open check valve between the control valve port 20 and the brake cylinder port 22 until the desired ratio is met in the brake cylinder port 22. Once this desired ratio is met, the ratio piston 48 will move back toward the right under the influence of the differential pressure and the biasing of the valve spring 58 until the valving element 56 seats on valve seat 54. This will terminate the fluid flow through the ratio piston 48. Any incremental increase in service or emergency fluid pressure in the empty load condition, will be proportioned by the ratio piston 48 and ratio valve to provide an appropriate ratio between the control valve port 20 and the brake cylinder port 22.

If an erroneous or false indication in car weight due to rock and roll is caused by the sensing lever 34 having a lengthened travel or extending further down the figures, the actuator 40 will move to the left disengaging from the valving element 56 and therefore will have no effect. If the car is completely empty and the sensing piston 42 is engaged against the housing, no further movement of the push rod 40 is possible.

If an erroneous or false indication in the car weight due to rock and roll is caused by the sensing lever 34 moving up from its nominal position, the push rod 40 and actuator 46 move to the right contacting the ratio valve. Not only will the ratio valve spring 58 apply force to move the ratio piston 48 back to the right, any added pressure flowing through the ratio valve will provide an increase of pressure locally on the large face 50 of the ratio piston. This will further increases the movement or repositioning of the ratio piston to the right and quickly move the seat 54 onto the valving element 56 to close the ratio valve. Since the ratio valve is closed quickly and the increase in pressure on the face 52 is localized, the pressure at the brake cylinder port 22 will not substantially change.

RELEASE OF EMPTY LOAD

The initial release from the control valve 28 exhausts fluid pressure from the control valve port 20 and the equalizing volume port 24 to the control valve 28. Since the combined upstream piping volume and the volume of the equalizing volume 32 are much smaller than the downstream volume within port 22 of the housing 12 and the brake cylinder 30, the immediate imbalance of pressure across the ratio piston 48 will be detected. The imbalance will cause the ratio piston 48 to move back to the right re-engaging with the end wall of bore 66. This disconnects the equalizing volume port 24 from the control valve port 20 and connects it to the exhaust port 26 as illustrated in FIG. 1. The differential pressure across the valving element 56 will overcome the bias of the ratio valve spring 58 opening the ratio valve. Thus, the brake cylinder pressure at brake port 22 will flow through the unseated valve to the control valve port 20. Once the pressure at brake cylinder port 22 becomes less than the pressure applied by spring 44, the spring 44 moves the push rod 40 to the right. When actuator 46 engages valving member 56, it drives it to its fully right position as illustrated in FIG. 1 holding the valve open. This mechanical driving of the ratio valve is a redundant to the differential pressure to retain the valve open as well as retaining the ratio piston against its first stop.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An empty-load device including:
   a housing having brake cylinder, control valve and equalizing volume ports;
   sensing means, having a sensing piston, for sensing load force bearing on a railroad car truck;
   ratio means, having a ratio piston and a ratio valve operated by said ratio piston, for limiting fluid pressure at the brake cylinder port from said control valve port;
   equalizing valve for connecting said control valve port and said equalizing volume port;
   a push rod, operatively connected to said sensing piston, said equalizing valve and said ratio means, for selectively controlling fluid pressure at the brake cylinder port in accordance with said sensed load force; the improvement comprising:
   said ratio valve including a valving element and a valve seat mounted on and traveling with said ratio piston.

2. An empty-load device according to claim 1, wherein said ratio valve is a check valve including a valve seat on said ratio piston, a valving element and a valve spring in said ratio piston.

3. An empty-load device according to claim 2, wherein
   said ratio piston has a first surface exposed to said control valve port and a second surface larger than said first surface and exposed to said brake cylinder port; and
   said ratio valve is at said first surface.

4. An empty-load device according to claim 3, wherein said sensing piston has a first surface facing said second surface of said ratio piston and exposed to said brake cylinder port.

5. An empty-load device according to claim 2, wherein said push rod engages and opens said ratio valve except for an empty sensed load force and said valve spring maintains said ratio piston against a first stop in said housing for a brake release and for a loaded sensed load force.

6. An empty-load device according to claim 5, wherein said ratio piston disengages said first stop for an empty sensed load force and said push rod engages said valving element and pistons said ratio piston for variations from said empty sensed load force.

7. An empty-load device according to claim 6, wherein said ratio piston is also repositioned by differential pressure across said ratio valve for an empty sensed load force.

8. An empty-load device according to claim 5, wherein said equalizing volume port is disconnected by said equalizing valve from said control valve port when said ratio piston engages said first stop and is connected by said equalizing valve to said control valve port when said ratio piston disengages said first stop.

9. An empty-load device according to claim 5 wherein said ratio valve includes a spring cage, and said spring cage also maintains said ratio piston against said first stop for a brake release.

10. An empty-load device according to claim 1, wherein said push rod engages and opens said ratio valve except for and empty sensed load force and said ratio valve maintains said ratio piston against a first stop in said housing for a brake release and for a loaded sensed load force.

11. An empty-load device according to claim 10, wherein said ratio piston disengages said first stop for an empty sensed load force and said push rod engages said ratio valve and positioned said ratio piston for variations from said empty sensed load force.

12. An empty-load device according to claim 11, wherein said ratio piston is also repositioned by differential pressure across said ratio valve for an empty sensed load force.

13. An empty-load device according to claim 10, wherein said equalizing volume port is disconnected by said equalizing valve from said control valve port when said ratio piston engages said first stop and is connected by said equalizing valve to said control valve port when said ratio piston disengages said first stop.

14. An empty-load device according to claim 1, wherein said brake cylinder port is between said sensing piston and said ratio piston, which are coaxial.

15. An empty-load device according to claim 1, wherein said push rod engages and opens said ratio valve except for an empty sensed load force.

16. An empty-load device according to claim 1 wherein:
said housing includes an exhaust port; and
said equalizing volume port is connected to said exhaust port and disconnected from said control valve port by said equalizing valve when said ratio piston is in brake release or a loaded load position and is disconnected from said exhaust port and connected to said control valve port by said equalizing valve when said ratio piston in an empty load position.

17. An empty-load device including;
a housing having a brake cylinder, control valve and equalizing volume ports;
sensing means having a sensing piston for sensing load force bearing on a railroad car truck;
ratio means having a ratio piston and a ratio valve operated by said ratio piston for limiting fluid pressure at the brake cylinder port from said control valve port;
equalizing valve for connecting said control valve port and said equalizing volume port;
a push rod, operatively connected to said sensing piston, said equalizing valve and said ratio means for selectively controlling fluid pressure at the brake cylinder port in accordance with said sensed load force; the improvement comprising:
said ratio valve is connected to said ratio piston by a spring; and
said push rod engages said ratio valve to open said ratio valve and to positions said ratio piston for variations of sensed load force via said spring.

18. An empty-load device according to claim 17, wherein said ratio piston is also repositioned by differential pressure across said ratio valve for an empty sensed load force.

19. An empty-load device according to claim 17 wherein:
said housing includes an exhaust port; and
said equalizing volume port is connected to said exhaust port and disconnected from said control valve port by said equalizing valve when said ratio piston is in a brake release or a loaded load position and is disconnected from said exhaust port and connected to said control valve port by said equalizing valve when said ratio piston is in an empty load position.

* * * * *